(12) United States Patent
Smith (10) Patent No.: US 10,288,482 B2
(45) Date of Patent: May 14, 2019

(54) EXTENDED CAVITY LASER ABSORPTION SPECTROSCOPY

(71) Applicant: National Technology & Engineering Solutions of Sandia, LLC, Albuquerque, NM (US)

(72) Inventor: Mark W. Smith, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 379 days.

(21) Appl. No.: 15/014,852

(22) Filed: Feb. 3, 2016

(65) Prior Publication Data

US 2016/0265973 A1    Sep. 15, 2016

Related U.S. Application Data

(60) Provisional application No. 62/131,074, filed on Mar. 10, 2015.

(51) Int. Cl.
| | | |
|---|---|---|
| *G01J 3/02* | (2006.01) | |
| *G01J 3/12* | (2006.01) | |
| *G01J 3/42* | (2006.01) | |

(52) U.S. Cl.
CPC ............. *G01J 3/42* (2013.01); *G01J 3/0208* (2013.01); *G01J 3/0216* (2013.01); *G01J 3/0264* (2013.01); *G01J 3/12* (2013.01)

(58) Field of Classification Search
CPC ..... G01J 3/42; G01J 2003/421; G01S 7/4916; G01B 9/02092
See application file for complete search history.

(56) References Cited

U.S. PATENT DOCUMENTS 3,601,490 A  *  8/1971  Erickson ............ G01B 9/02018
                                                            356/493
3,856,406 A    12/1974  Noble et al.
(Continued)

OTHER PUBLICATIONS

Victor Contreras, Jan Lonnqvist, and Juha Toivonen, "Edge filter enhanced self-mixing interferometry," Opt. Lett. 40, 2814-2817 (2015).*

*Primary Examiner* — Tri T Ton
*Assistant Examiner* — Rufus L Phillips
(74) *Attorney, Agent, or Firm* — Medley, Behrens & Lewis, LLC; Samantha Updegraff (57) ABSTRACT

Technologies for detecting absorption of electromagnetic radiation traveling through a measurement volume of interest are described herein. In a general embodiment, a laser is used to emit electromagnetic radiation through the measurement volume where absorption is desirably detected. An optical collector receives a portion of the radiation and directs a first fraction of the portion back to a gain medium of the laser, where the radiation is amplified and emitted again, and directs a second fraction to an optical sensor that can detect absorption in the measurement volume based upon attenuation of energy of the radiation. As the radiation feeds back to the gain medium and is emitted again, energy at attenuated wavelengths is amplified less than at other wavelengths. Thus, attenuation of energy of the radiation due to absorption in the measurement volume is cumulative, and relatively small absorptions are amplified, allowing smaller absorptions to be detected more easily.

10 Claims, 4 Drawing Sheets

(56) References Cited

U.S. PATENT DOCUMENTS

| | | |
|---|---|---|
| 3,893,771 A | 7/1975 | Bell |
| 6,795,190 B1 | 9/2004 | Paul et al. |
| 8,264,690 B2 | 9/2012 | Rao |
| 8,416,424 B2 * | 4/2013 | Werner ................ G01S 7/4811 356/488 |
| 8,446,592 B1 * | 5/2013 | Arissian ............ G01B 9/02003 356/484 |
| 9,200,960 B2 | 12/2015 | McKeever et al. |
| 2007/0206180 A1 * | 9/2007 | Liess ....................... G01P 3/366 356/28 |
| 2010/0103961 A1 * | 4/2010 | Yamazoe ........... H01S 3/09415 372/18 |
| 2010/0134803 A1 * | 6/2010 | Baier ..................... H01S 5/141 356/498 |
| 2015/0116724 A1 * | 4/2015 | Nieuwland ........... H01S 5/0622 356/477 |
| 2015/0226665 A1 | 8/2015 | Weidmann et al. |

\* cited by examiner

EXTENDED CAVITY LASER ABSORPTION SPECTROSCOPY

RELATED APPLICATION

This application claims priority to U.S. Provisional Patent Application No. 62/131,074, filed on Mar. 10, 2015, and entitled "EXTENDED CAVITY LASER ABSORPTION SPECTROSCOPY", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Intra-cavity laser absorption spectroscopy (ICLAS) is a technique used to detect very low concentrations of certain atomic and molecular species. A laser generally comprises a gain medium, a resonator cavity, and an energy source, called a pumping source. A conventional resonator cavity is constructed with two mirrors that reflect light back and forth between one another, with the gain medium in between. The gain medium is stimulated by light from the pumping source, and the light is amplified as it passes through the gain medium. The amplified light is then reflected by one of the mirrors, whereupon it passes through the gain medium again and is further amplified. As the light is reflected back and forth between the two mirrors, the light is continually amplified until reaching some steady state, ultimately resulting in a coherent beam of light or other electromagnetic (EM) radiation.

In ICLAS, a sample of interest is placed inside the resonator cavity of a laser. The mirrors confine most of the optical radiation emitted by the gain medium to the cavity of the laser, creating a multi-pass absorption effect in the sample as light is reflected and travels back and forth between the mirrors and through the sample. As the light travels through the sample, some wavelengths of the light may be absorbed by the sample more than others. When the light then returns to pass through the gain medium, the attenuation of the light at certain wavelengths as a result of the absorption in the sample causes the light at those wavelengths to be amplified less than light at wavelengths not absorbed by the sample. As the light is repeatedly fed back through the sample and the gain medium for amplification, incremental attenuation of light at wavelengths absorbed by the sample results in a larger total attenuation that can be observed with optical sensors. Because ICLAS requires that the sample be placed within the resonator cavity of the laser, ICLAS is an in-situ measurement technique primarily suitable for measurement of samples in laboratory environments.

SUMMARY

Systems and methods for extended cavity laser absorption spectroscopy (ECLAS) are described herein. In a general embodiment, a laser emits EM radiation into a measurement volume of interest external to the laser. The emitted radiation is then reflected from a scattering surface, retroreflector, or other surface, whereupon at least a portion of the emitted radiation is received by an optical collector. A partially reflective mirror or other device then directs the portion of the radiation received by the optical collector in two different directions. The mirror reflects a first fraction of the received radiation to a gain medium of the laser, causing the laser to emit further EM radiation. The mirror also reflects a second fraction of the received radiation to an optical sensor.

Passing the first fraction of the received radiation through the gain medium of the laser creates a feedback loop wherein EM radiation is emitted from the laser and passes through the measurement volume, whereupon it is collected by the optical collector and fed back to the laser to be emitted again. Each time the EM radiation passes through the loop it is subject to absorption by gases, particles, or other substances in the measurement volume. This absorption causes an attenuation in energy of the EM radiation at one or more wavelengths. When the attenuated radiation is amplified in the gain medium of the laser, attenuated wavelengths are amplified less than other wavelengths. As the EM radiation passes repeatedly through the feedback loop, even a small absorption in the measurement volume is amplified as a cumulative attenuation. Therefore, when the optical sensor receives the second fraction of the EM radiation, the optical sensor can detect the cumulative attenuation, which allows smaller absorptions to be observed than could otherwise be detected with a single-pass remote-sensing system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to extended-cavity laser absorption spectroscopy are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Figure 1:
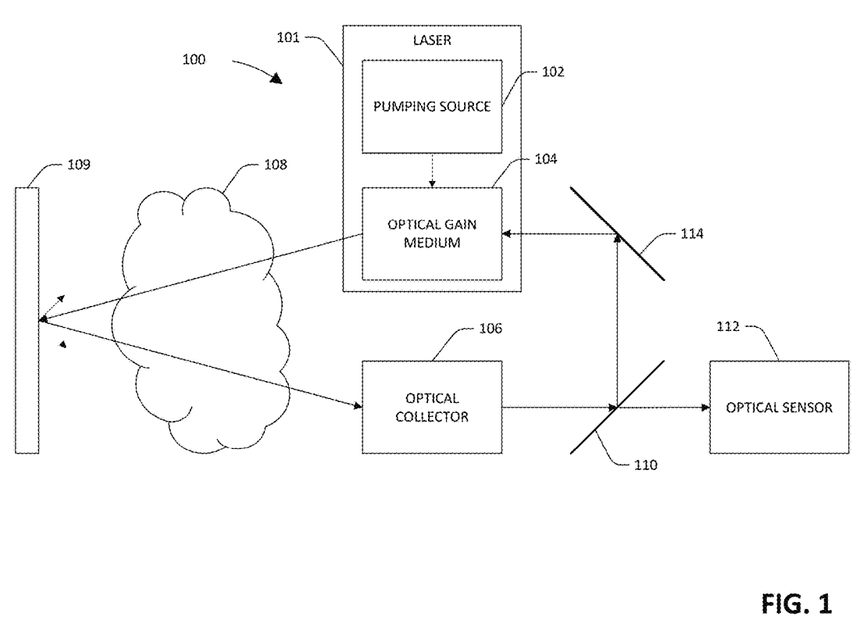
FIG. 1 is a functional block diagram of an exemplary system that facilitates ECLAS.

With reference to FIG. 1, an exemplary system 100 that facilitates ECLAS is illustrated. The system 100 includes a laser 101 with a pumping source 102 that stimulates an optical gain medium 104 to emit EM radiation, shown in FIG. 1 as arrows indicating paths of travel of the radiation. The system 100 further includes an optical collector 106 (e.g., a lens or telescope) that receives a portion of the EM radiation that passes through a measurement volume 108, where the EM radiation is at least partially reflected by a scattering surface 109. The optical collector 106 directs the received portion of the radiation to a partially reflective mirror 110 that reflects a first fraction of the radiation received by the optical collector 106 back to the optical gain medium 104. In an exemplary embodiment, the system 100 also includes a reflective mirror 114, which reflects the first fraction of the radiation and directs the first fraction to the optical gain medium 104. In another exemplary embodiment, the optical gain medium 104 and the partially reflective mirror 110 are positioned relative to one another such that the partially reflective mirror 110 directs the first fraction of the radiation received by the optical collector 106 directly to the optical gain medium 104. In yet another exemplary embodiment, multiple reflective mirrors can be used to direct the first fraction of the radiation to the optical gain medium 104.

The partially reflective mirror 110 allows a second fraction of the radiation received by the optical collector 106—the remainder—to pass through the mirror 110 and to an optical sensor 112. Again, as described above, the system 100 may optionally include additional mirrors or other optical elements to direct the second fraction of the radiation to the optical sensor 112. The second fraction of the radiation is used by the optical sensor 112 to determine one or more characteristics of the radiation, e.g. intensity as a function of wavelength. The first fraction of the radiation stimulates further EM emission as the first fraction passes through the optical gain medium 104, whereupon a cycle of emission, collection, measurement, and emission continues.

Details and principles of operation of the system 100 are now described. The laser 101 operates according to conventional laser principles. The pumping source 102 imparts energy to the optical gain medium 104 that causes electrons or other particles in the medium to enter an excited state. In the excited state, the electrons or other particles can be stimulated to emit photons as they transition back to a lower energy state. In a conventional laser system, a feedback path is created through the optical gain medium 104 by placing mirrors on either side of the medium 104 that direct EM radiation emitted by the medium 104 back into the medium 104 to be further amplified. This feedback ultimately results in a coherent beam of highly-focused EM radiation that, in a conventional laser, passes through one of the mirrors which is partially transparent. The emitted laser beam can then be used for purposes such as pointing, cutting, lighting, interferometry, etc.

In ICLAS, a sample of interest is probed by placing the sample in the resonator cavity of the laser itself, in the feedback path of the laser's EM emission. When EM radiation emitted from the gain medium of the laser passes through the sample, radiation at some wavelengths is absorbed at a higher rate than radiation of other wavelengths when it impinges on certain molecules or other particles in the sample. As a result, when the radiation feeds back through the gain medium less EM radiation is emitted at the highly-absorbed wavelengths than at other wavelengths present in the radiation. Thus, as the EM emission repeatedly bounces back and forth between the mirrors in the resonance cavity of the laser, the highly-absorbed wavelengths of the EM emission become more and more attenuated. Eventually, as the effective length of the path traveled by the EM radiation becomes large enough (e.g., thousands of kilometers), even relatively small absorption by particles in the sample can be detected in attenuation of the EM radiation.

In the exemplary ECLAS system 100, the sample is not required to be placed in a resonator cavity of the laser 101. Instead, EM radiation is emitted from the optical gain medium 104 into the measurement volume 108 to measure absorption of wavelengths of the EM radiation by particles in the measurement volume 108. The measurement volume 108 can be any region into which an EM emission from the optical gain medium 104 can be directed. Thus, for example, the measurement volume can be a region of open air several meters (e.g., one to hundreds of meters) away from the laser 101. ECLAS is therefore suitable for detecting relatively small absorptions of EM radiation outside of laboratory environments.

In an exemplary embodiment, the EM radiation emitted by the optical gain medium 104 passes through the measurement volume 108 and impinges upon the scattering surface 109. The scattering surface 109 can be any surface that scatters light or other EM radiation that impinges upon it. In an example, the scattering surface 109 can be a diffuse scattering surface, e.g., a rock, the ground, a wall, etc. In another example, the scattering surface can be non-diffuse, having some directionality to the scattering of EM radiation, e.g., retroreflectors. In still another example, the scattering surface can be a reflective surface such as a mirror aligned to direct the EM radiation in a desirable direction.

The optical collector 106 then collects a portion of the EM radiation after the radiation scatters from the scattering surface 109. The optical collector 106 can be any device suitable for receiving and directing EM radiation. In an example, the optical collector 106 is a telescope that gathers and focuses light. In the example, the telescope can be constructed either solely of refracting elements or of a combination of reflecting and refracting elements. By the time that the EM radiation reaches the optical collector 106, it has passed through the measurement volume 108. It is to be understood that while the EM radiation is shown in FIG. 1 as passing through the measurement volume 108 both on its path from the optical gain medium 104 to the scattering surface 109 and on its path from the scattering surface 109 to the optical collector 106, the EM radiation need only pass through the measurement volume 108 once. While passing through the measurement volume 108, the EM radiation is subject to change of its characteristics, e.g., absorption in some wavelengths and not others, based upon a presence of certain atoms, molecules, or particles. Hence, by the time the EM radiation emitted by the optical gain medium 104 reaches the optical collector 106, one or more wavelengths of the EM radiation may be attenuated as a result of absorption by atoms, molecules, or particles in the measurement volume 108.

EM radiation received by the optical collector 106 is then diverted in two directions. By way of example, the EM radiation can be split by directing the radiation to the partially reflective mirror 110, whereupon a first fraction of the EM radiation is reflected by the mirror 110 and a second fraction passes through the mirror 110. The first fraction of the EM radiation is directed to the optical gain medium 104 by the reflective mirror 114, closing a feedback loop and causing the optical gain medium 104 to emit additional EM radiation. The second fraction of the EM radiation is directed to the optical sensor 112 for measurement of one or more characteristics indicative of a characteristic of the measurement volume 108. In an example, the optical sensor 112 can be a spectrometer that identifies that a wavelength of the EM radiation is attenuated, which can be indicative of a presence or absence of a substance in the measurement volume 108.

While the partially reflective mirror 110 and the reflective mirror 114 are shown for purposes of illustration as being separate elements from the optical collector 106 and the laser 101, it is to be understood that the mirrors 110 and 114 can be in a same housing with and considered part of the optical collector 106 or the laser 101. Furthermore, in certain embodiments the reflective mirror 114 may not be necessary to direct the first fraction of the radiation to the optical gain medium 104 in a direction desirable for emission by the laser 101. In other embodiments, the partially reflective mirror 110 can be replaced with other suitable components, such as prisms, that are capable of directing fractions of the received radiation in different directions.

As the EM radiation passes through the feedback loop comprising the path from the optical gain medium 104 to the scattering surface 109, then from the scattering surface 109 to the optical collector 106, and finally from the optical collector 106 back to the optical gain medium 104, repeated absorption of a wavelength or wavelengths of the EM radiation causes attenuation of the absorbed wavelengths to be amplified. When attenuated EM radiation passes through the optical gain medium 104, radiation in attenuated wavelengths is amplified less than radiation in non-attenuated wavelengths. Furthermore, when the EM radiation passes through the measurement volume 108 again, further absorption of the EM radiation's energy in the attenuated wavelengths occurs. For each pass through the feedback loop, therefore, energy of the EM radiation in the absorbed wavelengths becomes increasingly attenuated. Ultimately, once the EM radiation has passed through the feedback loop several times, even a relatively small incremental absorption, e.g., from only some tens of atoms or molecules, can be detected as a cumulative attenuation of energy of the radiation by the optical sensor 112.

It is to be understood that while elements such as the laser 101, the optical collector 106, the optical sensor 112, and the mirrors 110 and 114 are depicted in FIG. 1 as being discrete elements, these components may be components of a same device. In an example, the laser 101, the optical collector 106, the optical sensor 112, and the mirrors 110 and 114 are components of a same device, wherein the device can be aimed at the measurement volume of interest 108 such that an aperture of the laser 101 and an aperture of the optical collector 106 face in a same direction. In the example, the device can be aimed at an object some distance (e.g., one to hundreds of meters) from the aperture of the laser, and the device can output an indication of a presence or absence of a substance of interest based upon an attenuation of one or more wavelengths of the radiation. For example, the exemplary device can be used to detect persistent chemicals indicative of a presence of chemical weapons or explosives. In another example, the device can be used to detect trace gases released by some material buried underground. Thus, ECLAS is not limited to conducting in-situ measurements in a controlled laboratory environment.

Figure 2:
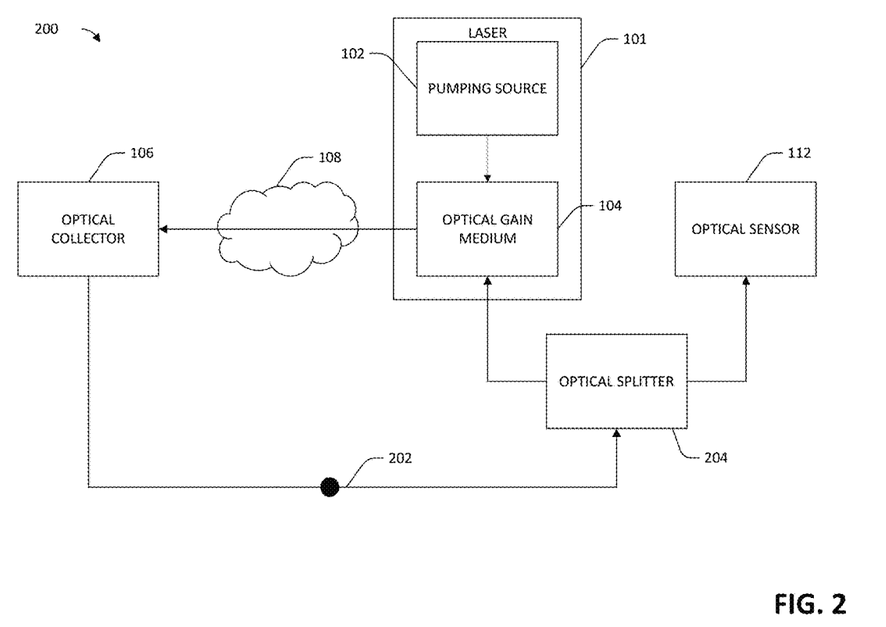
FIG. 2 is a functional block diagram of another exemplary system that facilitates ECLAS.

Referring now to FIG. 2, a second exemplary system 200 that facilitates ECLAS is illustrated. The system 200 includes the laser 101, comprising the pumping source 102 and the optical gain medium 104, wherein the optical gain medium 104 emits EM radiation into the measurement volume 108 responsive to receiving energy from the pumping source 102. The system 200 also includes the optical collector 106, wherein the optical collector 106 is positioned in a path of emission of the laser 101 with an aperture of the optical collector 106 facing the laser 101, such that the optical collector 106 directly receives (i.e., without scattering or reflecting from another object) EM radiation emitted by the laser 101 after the EM radiation travels through the measurement volume 108. In the exemplary system 200, the EM radiation received by the optical collector 106 travels by way of an optical transmission path 202 (e.g., a fiber-optic cable) to an optical splitter 204. The optical splitter 204 splits the EM radiation received from the transmission path 202 and diverts a first portion of the radiation's energy to the optical gain medium 104 and a second portion of the energy to the optical sensor 112. In one example, the optical splitter 204 can be a 99/1 splitter that directs 99% of the energy of the EM radiation it receives to the optical gain medium 104 and 1% of the energy to the optical sensor 112.

Lasers ordinarily emit light over a narrow range of wavelengths, or frequencies, e.g., fractions of a nanometer. In some embodiments of an ECLAS system, the laser 101 can be a broadband laser with a wavelength range of tens to hundreds of nanometers around a central wavelength. In an example, the central wavelength can be a wavelength between near UV (300 nm) and infrared (12 µm). For example, the laser 101 can be a gas laser, a dye laser, a titanium-sapphire laser, a diode laser, or other solid state laser. By using a relatively high bandwidth laser, an ECLAS system can potentially detect absorption across a broader range of wavelengths.

The laser 101 can also be pulsed, such that the laser 101 emits an initial pulse of EM radiation, where after the initial pulse of EM radiation travels through the feedback loop until it is amplified again, starting a cycle over. In this way, the initial pulse can be thought of as a lone pulse traveling repeatedly around the feedback loop of the system, being amplified each time it passes through the gain medium.

Figure 3:
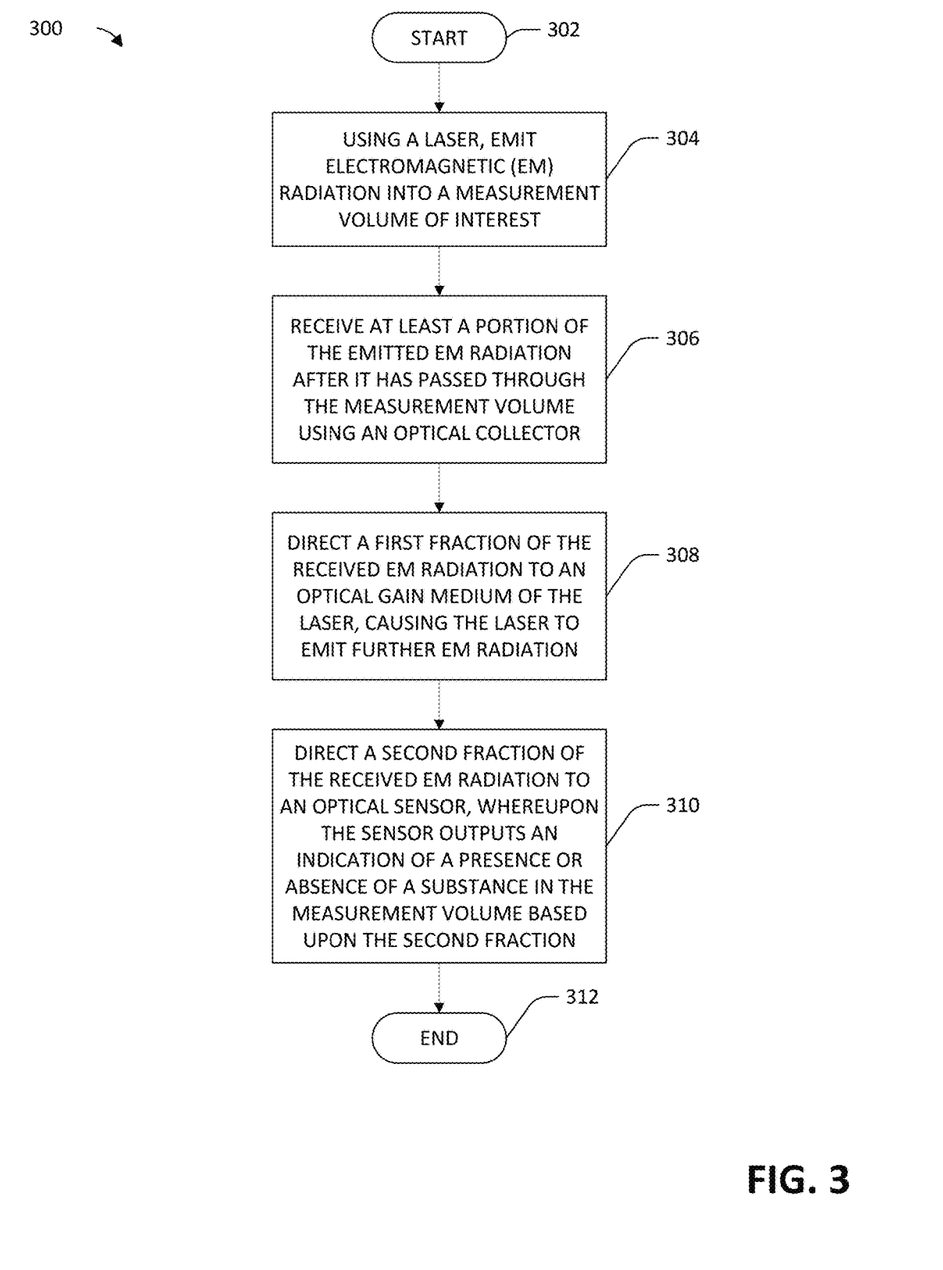
FIG. 3 is flow diagram that illustrates an exemplary methodology for performing ECLAS.

FIG. 3 illustrates an exemplary methodology relating to ECLAS. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act.

Further, in some instances, not all acts may be required to implement a methodology described herein.

Moreover, some of the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 3, a methodology 300 that facilitates ECLAS is illustrated. The methodology 300 begins at 302, and at 304 EM radiation is emitted from a laser into a measurement volume of interest. The EM radiation can be, for example, visible light, infrared radiation, ultraviolet radiation, etc. In an example, the EM radiation emitted from the laser comprises a plurality of wavelengths. The measurement volume of interest can be any volume desirably probed using ECLAS through which the EM radiation emitted by the laser can pass, e.g., an open-air region. At 306, at least a portion of the emitted EM radiation is received by an optical collector after the portion of the radiation has passed through the measurement volume. The portion of the emitted EM radiation can be received directly from the laser, such as when an aperture of the optical collector faces an emission aperture of the laser, or the portion can be received after the EM radiation has scattered after impinging upon a scattering surface, such as, for example, a rock, the ground, a wall, etc. At 308, a first fraction of the EM radiation received by the optical collector is directed to an optical gain medium of the laser, whereupon the optical gain medium amplifies the first fraction of the EM radiation and emits further EM radiation. At 310, a second fraction of the EM radiation received by the optical collector is directed to an optical collector, whereupon the sensor outputs an indication of a presence or absence of a substance in the measurement volume based upon the second fraction. In an example, the indication can be a spectrum of wavelengths of energy present in the second fraction of the EM radiation. In another example, the indication can be output based on detecting that one or more wavelengths of the EM radiation are attenuated from a known energy of wavelengths emitted by the laser. At 312, the methodology 300 ends.

Figure 4:
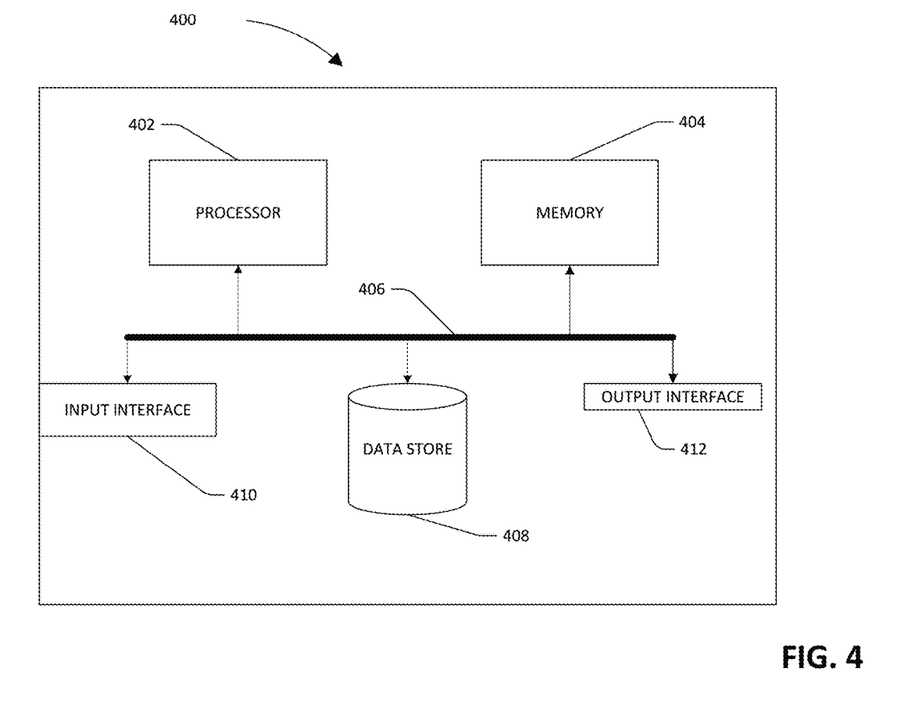
FIG. 4 is an exemplary computing system that can be used in connection with an ECLAS system.

Referring now to FIG. 4, a high-level illustration of an exemplary computing device 400 that can be used in accordance with the systems and methodologies disclosed herein is illustrated. For instance, the computing device 400 may be used in a system that facilitates user interaction with and control of an ECLAS system. By way of another example, the computing device 400 can be used in a system that receives and processes data from an optical sensor of an ECLAS system. The computing device 400 includes at least one processor 402 that executes instructions that are stored in a memory 404. The instructions may be, for instance, instructions for implementing functionality described as being carried out by one or more components discussed above or instructions for implementing one or more of the methods described above. The processor 402 may access the memory 404 by way of a system bus 406. In addition to storing executable instructions, the memory 404 may also store optical sensor data.

The computing device 400 additionally includes a data store 408 that is accessible by the processor 402 by way of the system bus 406. The data store 408 may include executable instructions, optical sensor data, etc. The computing device 400 also includes an input interface 410 that allows external devices to communicate with the computing device 400. For instance, the input interface 410 may be used to receive instructions from an external computer device, from a user, etc. The computing device 400 also includes an output interface 412 that interfaces the computing device 400 with one or more external devices. For example, the computing device 400 may display text, images, etc. by way of the output interface 412.

It is contemplated that the external devices that communicate with the computing device 400 via the input interface 410 and the output interface 412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 400 may be a distributed system. Thus, for instance, several devices may be in communication by way of a network connection and may collectively perform tasks described as being performed by the computing device 400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
a laser comprising a gain medium, the gain medium emitting electromagnetic radiation into a measurement volume responsive to stimulation by a pumping source, the measurement volume being external to the laser;
a spectrometer;
an optical splitter; and
an optical collector positioned to receive at least a portion of electromagnetic radiation emitted by the laser, the optical collector configured to divert the received portion of the electromagnetic radiation to the optical splitter, the optical splitter configured to divert a first fraction of the received portion of the electromagnetic radiation to the gain medium, wherein the first fraction of the received portion of the electromagnetic radiation thereby stimulates further emission of electromagnetic radiation from the gain medium, the optical splitter further configured to divert a second fraction of the received portion of the electromagnetic radiation to the spectrometer, the spectrometer configured to output an indication of an attenuation of one or more wavelengths of the second fraction of the received portion of the electromagnetic radiation responsive to receiving the second fraction of the received portion of the electromagnetic radiation, the attenuation being indicative of a characteristic of the measurement volume.

2. The system of claim 1, the optical collector comprising a telescope.

3. The system of claim 2, the optical splitter comprising a partially reflective mirror, wherein the telescope receives the portion of the electromagnetic radiation, the mirror positioned to receive the portion from the telescope and to direct the first fraction of the electromagnetic radiation to the gain medium and the second fraction of the electromagnetic radiation to the spectrometer.

4. The system of claim 2, wherein an aperture of the telescope faces an aperture of the laser, the telescope receiving the portion of the electromagnetic radiation directly from the laser.

5. The system of claim 4, the telescope receiving the portion of the electromagnetic radiation, the optical collector further comprising a fiber optic cable and an optical splitter, the optical splitter receiving the portion of the electromagnetic radiation from the telescope by way of the fiber optic cable, the optical splitter configured to divert the first fraction of the portion of the electromagnetic radiation to the gain medium, the optical splitter further configured to divert the second fraction of the portion of the electromagnetic radiation to the optical sensor.

6. The system of claim 1, the optical collector and the laser being collocated as components of a same device.

7. The system of claim 6, the measurement volume being separated from the device by a distance between 1 meter and 100 meters.

8. The system of claim 1, the characteristic being a presence or absence of a substance in the measurement volume.

9. The system of claim 1, the electromagnetic radiation emitted by the laser having wavelengths in a range of tens to hundreds of nanometers around a center wavelength.

10. A system comprising:
a laser comprising a gain medium, the gain medium emitting electromagnetic radiation into a measurement volume responsive to stimulation by a pumping source, the measurement volume being external to the laser;
an optical sensor;
an optical splitter;
an optical collector positioned to receive at least a portion of electromagnetic radiation emitted by the laser, the optical collector configured to divert the received portion of the electromagnetic radiation to the optical splitter, the optical splitter configured to divert a first fraction of the received portion of the electromagnetic radiation to the gain medium, wherein the first fraction of the received portion of the electromagnetic radiation thereby stimulates further emission of electromagnetic radiation from the gain medium, the optical splitter further configured to divert a second fraction of the received portion of the electromagnetic radiation to the optical sensor, the optical sensor configured to output an indication of an attenuation of one or more wavelengths of the second fraction of the received portion of the electromagnetic radiation responsive to receiving the second fraction of the received portion of the electromagnetic radiation, the attenuation being indicative of a characteristic of the measurement volume; and
a processor that determines the absence or presence of a substance in the measurement volume based on the attenuation.

* * * * *